United States Patent
Oh

(10) Patent No.: US 8,736,567 B2
(45) Date of Patent: May 27, 2014

(54) TOUCH SCREEN PANEL

(75) Inventor: Hyun-Uk Oh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 135 days.

(21) Appl. No.: 13/414,637

(22) Filed: Mar. 7, 2012

(65) Prior Publication Data

US 2013/0181912 A1 Jul. 18, 2013

(30) Foreign Application Priority Data

Jan. 12, 2012 (KR) .................. 10-2012-0003927

(51) Int. Cl.
  *G06F 3/041* (2006.01)

(52) U.S. Cl.
  USPC ........................................... 345/173

(58) Field of Classification Search
  USPC ........................................... 345/173
  See application file for complete search history.

(56) References Cited

U.S. PATENT DOCUMENTS

2011/0050625 A1* 3/2011 Kim et al. ............... 345/174
2011/0193796 A1* 8/2011 Cho et al. ............... 345/173
2012/0105343 A1* 5/2012 Lee et al. ............... 345/173

FOREIGN PATENT DOCUMENTS

KR 10 2011 0001907 A 1/2011

* cited by examiner

*Primary Examiner* — Aneeta Yodichkas
(74) *Attorney, Agent, or Firm* — Christie, Parker & Hale, LLP

(57) ABSTRACT

A touch screen panel including first sense electrodes including a plurality of first sense cells arranged on a substrate in a first direction and first connection patterns electrically connecting adjacent first sense cells of the plurality of first sense cells; second sense electrodes including a plurality of second sense cells arranged on the substrate in a second direction that crosses the first direction, relay patterns arranged within the first sense electrodes, and metal patterns connected between the relay patterns and second sense cells of the plurality of second sense cells adjacent to the relay patterns; and auxiliary patterns electrically connecting two regions of the first sense electrodes divided by the relay patterns and the metal patterns.

11 Claims, 4 Drawing Sheets

# TOUCH SCREEN PANEL

CROSS-REFERENCE TO RELATED APPLICATION

This application claims priority to and the benefit of Korean Patent Application No. 10-2012-0003927, filed on Jan. 12, 2012 in the Korean Intellectual Property Office, the entire content of which is incorporated herein by reference.

BACKGROUND

1. Field

Aspects of embodiments of the present invention relate to a touch screen panel.

2. Description of the Related Art

A touch screen panel is an input device capable of selecting the indication content displayed on the screen of an image display device by a human hand or an object to input the command of a user.

The touch screen panel is provided on the entire surface of the image display device to convert a contact position of the human hand or the object into an electrical signal. Therefore, the instruction contact selected in the contact position is received as an input signal.

Since the touch screen panel may replace an additional input device coupled to the image display device to operate, such as a keyboard and a mouse, use of the touch screen panel is increasing.

Methods of realizing a touch screen panel include a resistance layer method, a photo-sensing method, and a capacitance method.

Among the above methods, the touch screen panel by the capacitance method that is recently widely used detects a point in which capacitance changes as the human hand or the object contacts the contact position.

The touch screen panel by the capacitance method includes a plurality of sense cells arranged in a specific direction, and sense electrodes including connection patterns for electrically connecting the sense cells to each other.

However, the connection patterns having a relatively small width are often broken by static electricity from the outside, and in this case, it may not be possible to detect a touch position.

SUMMARY

According to an aspect of embodiments of the present invention, a touch screen panel includes auxiliary patterns that form additional current paths to normally operate even when sense cells are partially broken. According to another aspect of embodiments of the present invention, a touch screen panel is capable of preventing or substantially preventing a defect in driving in an occurrence of an inflow of static electricity.

According to an embodiment of the present invention, a touch screen panel includes: first sense electrodes including a plurality of first sense cells arranged on a substrate in a first direction and first connection patterns electrically connecting adjacent first sense cells of the plurality of first sense cells; second sense electrodes including a plurality of second sense cells arranged on the substrate in a second direction that crosses the first direction, relay patterns arranged within the first sense electrodes, and metal patterns connected between the relay patterns and second sense cells of the plurality of second sense cells adjacent to the relay patterns; and auxiliary patterns electrically connecting two regions of the first sense electrodes divided by the relay patterns and the metal patterns.

The auxiliary patterns may cross the relay patterns arranged in a different layer and electrically connect the two regions of the first sense electrodes.

The touch screen panel may further include an insulating layer between the first sense electrodes and the relay patterns, and the auxiliary patterns may contact the two regions of the first sense electrodes through contact holes formed in the insulating layer.

The auxiliary patterns may detour around the metal patterns arranged in a same layer and electrically connect the two regions of the first sense electrodes.

The touch screen panel may further include an insulating layer between the first sense electrodes and the second sense cells, and the auxiliary patterns may contact the two regions of the first sense electrodes through contact holes formed in the insulating layer.

The auxiliary patterns may be formed of a same material and in a same layer as the metal patterns.

The metal patterns may be arranged obliquely with respect to the second direction.

The relay patterns may be separated from the first sense electrodes by a distance.

The relay patterns may be formed of a same material and in a same layer as the first sense electrodes.

The second sense cells may be formed of a same material and in a same layer as the first sense electrodes.

The first sense electrodes, the second sense cells, and the relay patterns may be formed of a transparent conductive material.

As described above, according to an aspect of embodiments of the present invention, the touch screen panel includes the auxiliary patterns that form the current paths to normally operate even when parts of the sense cells are broken.

BRIEF DESCRIPTION OF THE DRAWINGS

The accompanying drawings, together with the specification, illustrate some exemplary embodiments of the present invention, and, together with the description, serve to explain aspects and principles of the present invention.

DETAILED DESCRIPTION

Figure 1:
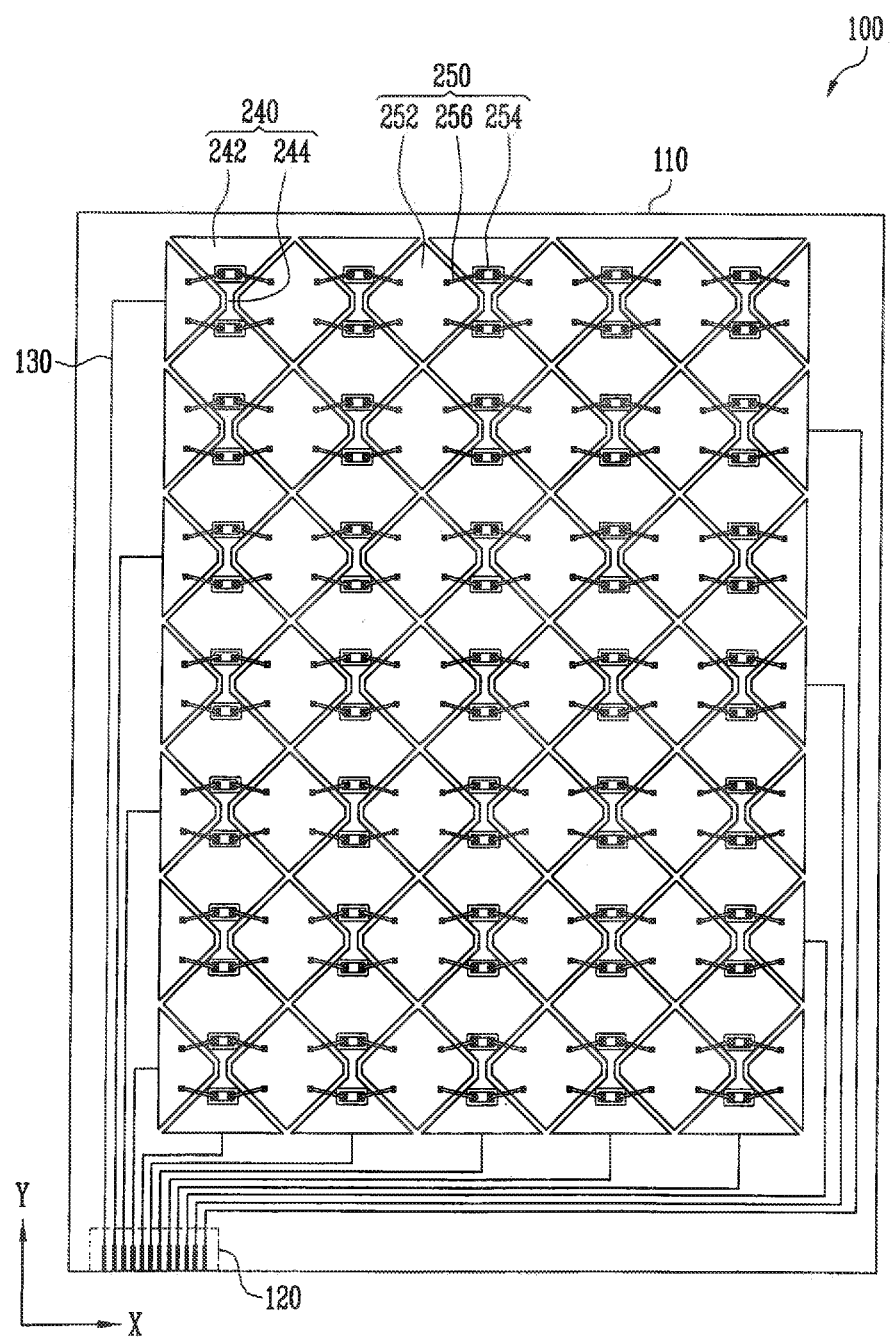
FIG. 1 is a schematic view of a touch screen panel according to an embodiment of the present invention.

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it may be directly on the another element or may be indirectly on the another element with one or more intervening elements interposed therebetween. Also, when an element is referred to as being "connected to" another element, it may be directly connected to the another element or may be indirectly connected to the another element with one or more intervening elements interposed therebetween. Hereinafter, like reference numerals refer to like elements.

Aspects and characteristics of embodiments of the present invention and a method of achieving the aspects and characteristics of embodiments of the present invention are described more fully herein with reference to the accompanying drawings, in which some exemplary embodiments of the present invention are shown. The present invention may, however, be embodied in many different forms and should not be construed as being limited to the embodiments set forth herein. In the drawings, when a part is coupled or electrically coupled to another part, the part may be directly coupled or electrically coupled to the another part, or the part may be indirectly coupled or electrically coupled to the another part with another element interposed therebetween. In the drawings, some parts that are not related to the present invention may be omitted for clarity of description. Like reference numerals in different drawings represent the same element, and thus repeated description thereof may be omitted.

A touch screen panel according to some exemplary embodiments of the present invention is described below with reference to the drawings for describing the embodiments of the present invention.

Figure 2:
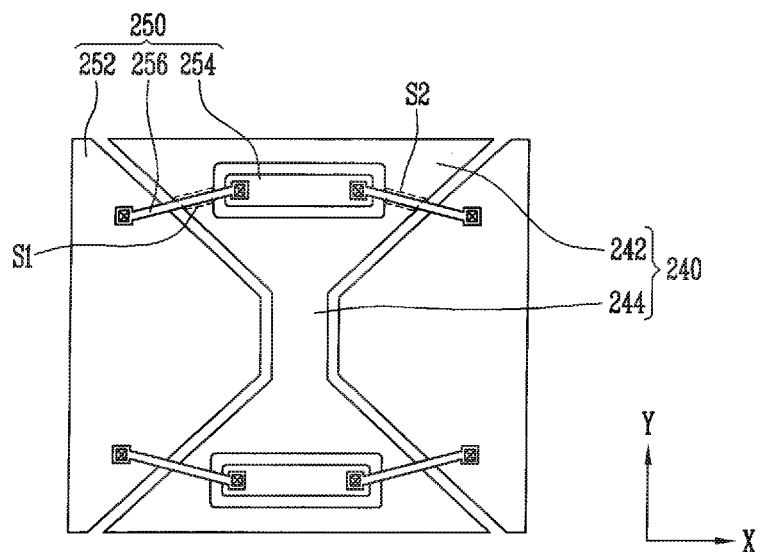
FIG. 2 is an enlarged view of a part of the touch screen panel of FIG. 1.

FIG. 1 is a schematic view of a touch screen panel according to an embodiment of the present invention. FIG. 2 is an enlarged view of a part of the touch screen panel of FIG. 1.

Referring to FIGS. 1 and 2, first sense electrodes 240 and second sense electrodes 250 that constitute a basic structure of a touch screen panel 100 according to an embodiment of the present invention will be described first.

The touch screen panel 100 includes a substrate 110, and the first sense electrodes 240 and the second sense electrodes 250 are arranged on the substrate 110. The substrate 110 may be formed of a material having an insulation property, such as glass, plastic, silicon, or synthetic resin, and, in one embodiment, may be a flexible film.

The substrate 110, in one exemplary embodiment, is transparent such that the substrate 110 may transmit light, and further may be divided into an active region in which the first sense electrodes 240 and the second sense electrodes 250 are arranged, and a non-active region (e.g., a region around the active region) in which a pad unit 120 and a position detection line 130 are arranged.

An external touch driving circuit (not shown) may be electrically connected to the pad unit 120.

Signals from the sense electrodes 240 and 250 may be transmitted to the touch driving circuit through the position detection line 130, and the touch driving circuit may thereby receive a touch position.

The position detection line 130, in one embodiment, may be formed of a low-resistance metal material or a transparent electrode material such as Mo, Ag, Ti, Cu, Al, or Mo/Al/Mo.

A plurality of the first sense electrodes 240 and a plurality of the second sense electrodes 250 may be arranged on the substrate 110 to intersect or cross each other.

In one embodiment, the plurality of first sense electrodes 240 may be longitudinally formed in a first direction (e.g., a Y-axis direction) to be arranged in a second direction (e.g., an X-axis direction) that intersects or crosses the first direction.

The first sense electrodes 240, in one embodiment, may include a plurality of first sense cells 242 arranged in the first direction and first connection patterns 244 for electrically connecting adjacent ones of the first sense cells 242 to each other.

In one embodiment, as illustrated in FIG. 2, the first connection patterns 244 may be integrated with the first sense cells 242.

The first sense cells 242 and the first connection patterns 244, in one exemplary embodiment, are formed of a transparent conductive material, such as indium tin oxide (ITO) or indium zinc oxide (IZO).

The second sense electrodes 250, in one embodiment, are longitudinally formed in the second direction to be arranged in the first direction.

In one embodiment, the second sense electrodes 250 may include second sense cells 252, relay patterns 254, and metal patterns 256.

The second sense cells 252, in one embodiment, are dispersedly arranged in the second direction not to overlap the first sense electrodes 240 and are electrically connected to each other by the relay patterns 254 and the metal patterns 256.

In order to simplify or reduce processes, the second sense cells 252 may be formed of the same material as the first sense electrodes 240 in the same layer.

The second sense cells 252, in one exemplary embodiment, are formed of a transparent conductive material, such as ITO or IZO, like the first sense electrodes 240.

The relay patterns 254 are positioned within the first sense electrodes 240 and are electrically separated from the first sense electrodes 240. In one exemplary embodiment, the relay patterns 254 are separated from the first sense electrodes 240 by a distance (e.g., a predetermined distance).

In one embodiment, the relay patterns 254 may be formed of the same material as the first sense electrodes 240 in the same layer.

In the case where the relay patterns 254 are formed by the same processes as the first sense electrodes 240, an additional mask process for forming the relay patterns 254 is not required so that the number of processes and process time may be reduced.

The metal patterns 256, in one embodiment, are connected between the relay patterns 254 and the second sense cells 252 adjacent to the relay patterns 254 in order to electrically connect the second sense cells 252 to each other.

The metal patterns 256, in one exemplary embodiment, are obliquely arranged with respect to the first direction to have an angle or slope (e.g., a predetermined slope).

In accordance with the visual characteristic of human beings in which the degree of recognition with respect to an oblique direction is lower than with respect to a vertical direction, the metal patterns 256 are less visualized so that visibility may be improved.

In order to simplify or reduce processes, the metal patterns 256 may be formed in the same process as the position detection line 130 positioned in the non-active region of the touch screen panel 100.

In one embodiment, the metal patterns 256 may be formed of a low-resistance metal material, such as Mo, Ag, Ti, Cu, Al, or Mo/Al/Mo.

As a result, the second sense cells 252 may be electrically connected to adjacent ones of the second sense cells 252 by the above-described relay patterns 254 and metal patterns 256.

In addition, the metal patterns 256 having low resistance may be used such that charges flow smoothly in the parts where the second sense cells 252 are connected to each other. Therefore, the sensing sensitivity of the second sense electrodes 250 is improved.

The first sense electrodes 240 may be divided into two regions based on the relay patterns 254 and the metal patterns 256 connected to the relay patterns 254.

The two regions of the first sense electrodes 240 are not physically separated by the relay patterns 254 and the metal patterns 256 but refer to the regions of the first sense electrodes 240 divided using the relay patterns 254 and the metal patterns 256 that exist in different layers as a kind of reference lines.

When static electricity having a high voltage is flowed from the outside, the regions of the first sense cells 242 (i.e. the regions S1 and S2) that are overlapped with the metal patterns 256 may be broken by Joule heat in accordance with an increase in current. In particular, the inclined parts of the first sense cells 242 that are generated where the metal patterns 256 cross at the regions S1 and S2 may be broken.

That is, in one embodiment, the first sense cells 242 formed of the transparent conductive material (e.g., ITO) have weaker durability than the metal patterns 256 formed of metal and are vulnerable to static electricity, and the first sense cells 242 may be broken together with an insulating layer interposed between the first sense cells 242 and the metal patterns 256 when static electricity is flowed.

For example, when the first sense cells 242 at the regions S1 and S2 are partially broken in accordance with the flow of the static electricity, since the flow of current is blocked, touch signals may not be normally detected from the first sense electrodes 240.

Therefore, according to embodiments of the present invention, in order to prevent or substantially prevent a defect in driving generated when the static electricity is flowed as described above, auxiliary patterns 270 for forming additional current paths are further included in the touch screen panel 100.

Figure 3:
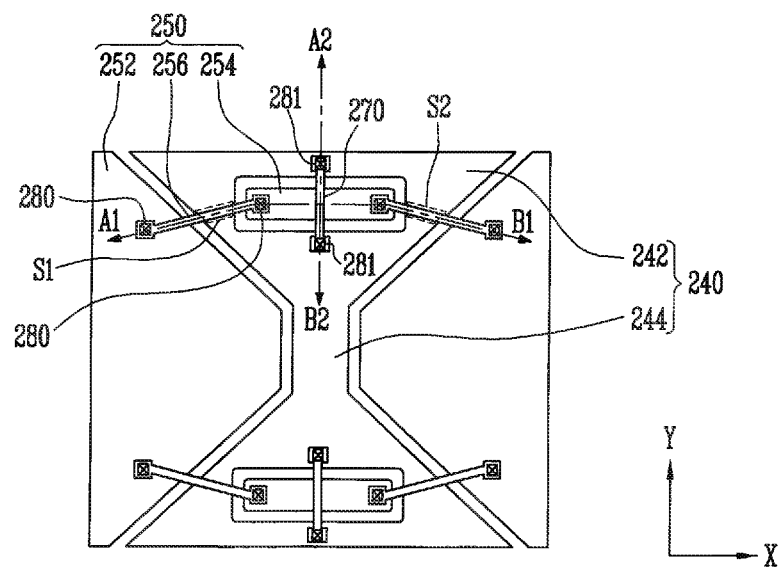
FIG. 3 is an enlarged view of a portion of a touch screen panel including auxiliary patterns according to an embodiment of the present invention.
Figure 4:
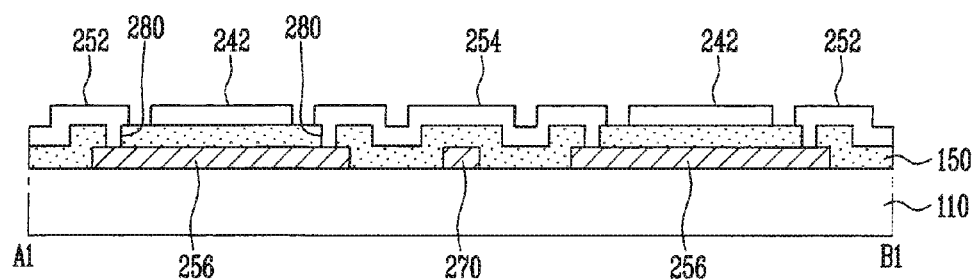
FIG. 4 is a sectional view of the portion of the touch screen panel including auxiliary patterns of FIG. 3, taken along the line A1-B1.
Figure 5:
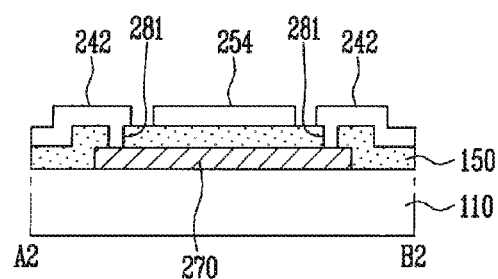
FIG. 5 is a sectional view of the portion of the touch screen panel including auxiliary patterns of FIG. 3, taken along the line A2-B2.

FIG. 3 is an enlarged view of a portion of a touch screen panel including auxiliary patterns according to an embodiment of the present invention. FIG. 4 is a sectional view of the portion of the touch screen panel including auxiliary patterns of FIG. 3, taken along the line A1-B1. FIG. 5 is a sectional view of the portion of the touch screen panel including auxiliary patterns of FIG. 3, taken along the line A2-B2.

The auxiliary patterns 270 according to an embodiment of the present invention electrically connect the two regions of the first sense electrodes 240 divided by the relay patterns 254 and the metal patterns 256.

As illustrated in FIG. 3, the auxiliary patterns 270 according to one embodiment of the present invention cross the relay patterns 254 positioned in a different layer to connect the two regions of the first sense electrodes 240.

In one embodiment, referring to FIGS. 4 and 5, the metal patterns 256 and the auxiliary patterns 270 are positioned on the substrate 110 and an insulating layer 150 may be formed on the metal patterns 256 and the auxiliary patterns 270.

In one embodiment, the first sense cells 242 and the first connection patterns 244 that constitute the first sense electrodes 240, the second sense cells 252, and the relay patterns 254 may be formed on the insulating layer 150.

The metal patterns 256 may contact the second sense cells 252 and the relay patterns 254 through contact holes 280 formed in the insulating layer 150.

Therefore, the second sense cells 252 adjacent to each other may be electrically connected to each other through the relay patterns 254 and the metal patterns 256.

In one embodiment, the insulating layer 150 is interposed between the relay patterns 254 and the first sense electrodes 240, and the auxiliary patterns 270 electrically connect the two regions or points of the first sense cells 242 with the relay patterns 254 interposed therebetween.

In one embodiment, one end of the auxiliary pattern 270 is connected to the first sense cell 242 positioned at one side (e.g., at an upper side in FIG. 3) of the relay pattern 254, and the other end of the auxiliary pattern 270 may be connected to the first sense cell 242 positioned at the other side (e.g., at a lower side in FIG. 3).

In one embodiment, the other end of the auxiliary pattern 270 may be further extended to be connected to the first connection pattern 244 rather than to the first sense cell 242.

The auxiliary patterns 270 may contact the first sense cells 242 and/or the first connection patterns 244 through contact holes 281 formed in the insulating layer 150.

The auxiliary patterns 270 in an exemplary embodiment are formed of a metal not to be easily broken by static electricity, and may be formed of a low resistance-material such as Mo, Ag, Ti, Cu, Al, or Mo/Al/Mo.

In one embodiment, in order to simplify or reduce processes, the auxiliary patterns 270 may be formed in the same process as the metal patterns 256. Therefore, the auxiliary patterns 270 may be formed of the same material as the metal patterns 256 in the same layer.

Therefore, even though the parts (e.g., the parts that exist in the regions S1 and S2) that overlap the metal patterns 256 among the first sense cells 242 may be broken due to the flow of static electricity, since the current paths are secured by the auxiliary patterns 270 that cross the relay patterns 254, the touch screen panel 100 may still be normally driven.

Figure 6:
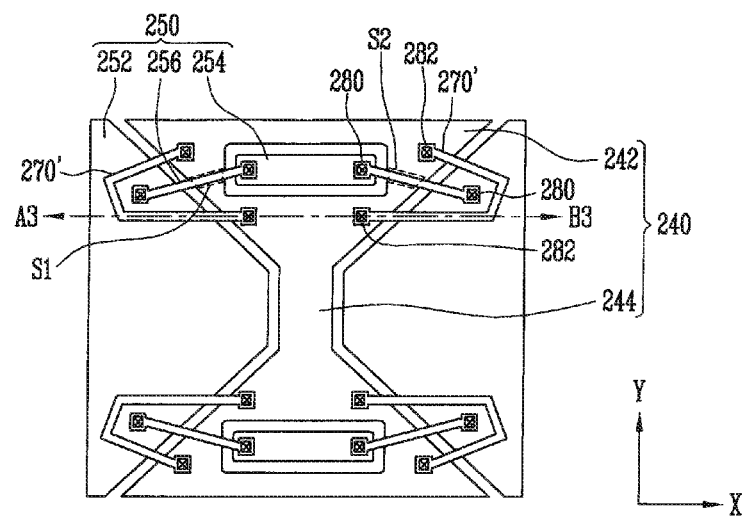
FIG. 6 is an enlarged view of a portion of a touch screen panel including auxiliary patterns according to another embodiment of the present invention.
Figure 7:
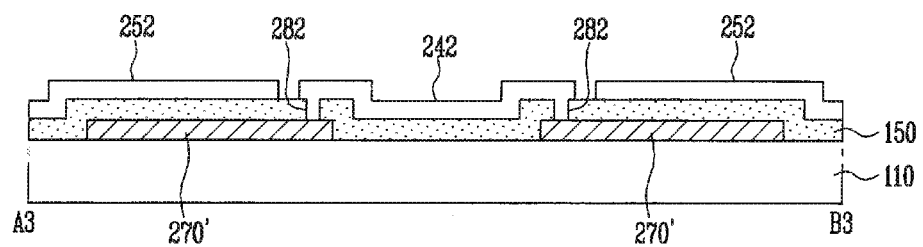
FIG. 7 is a sectional view of the portion of the touch screen panel including auxiliary patterns of FIG. 6, taken along the line A3-B3.

FIG. 6 is an enlarged view of a portion of a touch screen panel including auxiliary patterns according to another embodiment of the present invention. FIG. 7 is a sectional view of the portion of the touch screen panel including auxiliary patterns of FIG. 6, taken along the line A3-B3.

The touch screen panel including the auxiliary patterns according to another embodiment of the present invention is described below with reference to FIGS. 6 and 7.

Auxiliary patterns 270 and 270' according to embodiments of the present invention electrically connect the two regions of the first sense electrodes 240 divided by the relay patterns 254 and the metal patterns 256.

As illustrated in FIG. 6, the auxiliary patterns 270' according to another embodiment of the present invention do not overlap the relay patterns 254, in contrast to the auxiliary patterns 270 described above, and connect the two regions of the first sense electrodes 240 while detouring around the metal patterns 256 positioned in the same layer.

The auxiliary patterns 270' detour around the metal patterns 256 and do not overlap the metal patterns 256 positioned in the same layer, and the insulating layer 150 is interposed between the overlapping first sense electrodes 240 and second sense cells 252 and the auxiliary patterns 270'.

The auxiliary patterns 270' may contact the first sense cells 242 and/or the first connection patterns 244 through contact holes 282 formed in the insulating layer 150.

In one embodiment, one end of the auxiliary pattern 270' may be connected to the first sense cell 242 positioned at one side (e.g., at an upper side in FIG. 6) of the metal pattern 256 and may be connected to the first sense cell 242 positioned at the other side (e.g., at a lower side in FIG. 6) of the metal pattern 256.

Therefore, even though the parts (e.g., the parts that exist in the regions S1 and S2) that overlap the metal patterns 256 among the first sense cells 242 may be broken by the flow of static electricity, since current paths are secured by the auxiliary patterns 270' that detour the metal patterns 256, the touch screen panel including the auxiliary patterns 270' may still be normally driven.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
    first sense electrodes including a plurality of first sense cells arranged on a substrate in a first direction and first connection patterns electrically connecting adjacent first sense cells of the plurality of first sense cells;
    second sense electrodes including a plurality of second sense cells arranged on the substrate in a second direction that crosses the first direction, relay patterns arranged within the first sense electrodes, and metal patterns connected between the relay patterns and second sense cells of the plurality of second sense cells adjacent to the relay patterns; and
    auxiliary patterns electrically connecting two regions of the first sense electrodes divided by the relay patterns and the metal patterns, the auxiliary patterns contacting respective ones of the first sense electrodes at each of the two regions.

2. The touch screen panel of claim 1, wherein the auxiliary patterns cross the relay patterns arranged in a different layer and electrically connect the two regions of the first sense electrodes.

3. The touch screen panel of claim 2, further comprising an insulating layer between the first sense electrodes and the relay patterns, wherein the auxiliary patterns contact the two regions of the first sense electrodes through contact holes formed in the insulating layer.

4. The touch screen panel of claim 1, wherein the auxiliary patterns detour around the metal patterns arranged in a same layer and electrically connect the two regions of the first sense electrodes.

5. The touch screen panel of claim 4, further comprising an insulating layer between the first sense electrodes and the second sense cells, wherein the auxiliary patterns contact the two regions of the first sense electrodes through contact holes formed in the insulating layer.

6. The touch screen panel of claim 1, wherein the auxiliary patterns are formed of a same material and in a same layer as the metal patterns.

7. The touch screen panel of claim 1, wherein the metal patterns are arranged obliquely with respect to the second direction.

8. The touch screen panel of claim 1, wherein the relay patterns are separated from the first sense electrodes by a distance.

9. The touch screen panel of claim 1, wherein the relay patterns are formed of a same material and in a same layer as the first sense electrodes.

10. The touch screen panel of claim 9, wherein the second sense cells are formed of a same material and in a same layer as the first sense electrodes.

11. The touch screen panel of claim 1, wherein the first sense electrodes, the second sense cells, and the relay patterns are formed of a transparent conductive material.

\* \* \* \* \*